(12) United States Patent
Kempf et al.

(10) Patent No.: US 9,759,510 B1
(45) Date of Patent: Sep. 12, 2017

(54) VIBRATION DAMPENING LIMB BOLT

(71) Applicants: James J. Kempf, Coralville, IA (US); Dorge O. Huang, Henry, IL (US)

(72) Inventors: James J. Kempf, Coralville, IA (US); Dorge O. Huang, Henry, IL (US)

( * ) Notice: Subject to any disclaimer, the term of this patent is extended or adjusted under 35 U.S.C. 154(b) by 45 days.

(21) Appl. No.: 15/064,979

(22) Filed: Mar. 9, 2016

(51) Int. Cl.
*F16B 35/06* (2006.01)
*F41B 5/14* (2006.01)
*F16B 37/14* (2006.01)

(52) U.S. Cl.
CPC ............ *F41B 5/1426* (2013.01); *F16B 35/06* (2013.01); *F16B 37/145* (2013.01)

(58) Field of Classification Search
CPC .... F16B 23/0007; F16B 23/003; F16B 35/04; F16B 35/06; F16B 37/14; F16B 37/145; F41B 5/1426
USPC ......... 411/381–382, 383, 395, 396–397, 403
See application file for complete search history.

(56) References Cited

U.S. PATENT DOCUMENTS

| | | | | |
|---|---|---|---|---|
| 824,983 A * | 7/1906 | Farrington | ............ | F16B 23/003 351/141 |
| 1,194,792 A * | 8/1916 | Stewart | ............ | F16B 5/02 411/178 |
| 2,931,265 A * | 4/1960 | De Lacy | ............ | F16B 23/00 411/403 |
| 2,993,950 A * | 7/1961 | Forman | ............ | F16B 25/0094 174/138 D |
| 4,033,243 A * | 7/1977 | Kirrish | ............ | F16B 37/145 411/338 |
| 5,391,028 A * | 2/1995 | Charles | ............ | F16B 37/145 244/1 A |
| 5,454,676 A * | 10/1995 | Conte | ............ | A63C 17/0006 411/339 |
| 6,033,170 A * | 3/2000 | Gold | ............ | F16B 15/00 411/397 |
| 6,361,258 B1 * | 3/2002 | Heesch | ............ | F16B 23/0084 411/178 |
| 7,344,346 B2 * | 3/2008 | Hsu | ............ | F16B 21/02 411/21 |
| 7,985,040 B2 * | 7/2011 | Cao | ............ | F16B 35/041 411/178 |
| 8,696,274 B2 * | 4/2014 | Kim | ............ | F16B 31/00 411/2 |
| 2008/0286071 A1 * | 11/2008 | Potter | ............ | F16B 1/0071 411/372.6 |

(Continued)

*Primary Examiner* — Roberta Delisle
(74) *Attorney, Agent, or Firm* — Donald J. Ersler

(57) ABSTRACT

A vibration dampening limb bolt preferably includes a hollow bolt and a vibration-dampening member. The hollow bolt includes a countersunk head and a bore. At least a portion of the bore is threaded to form a threaded bore. It is preferably that a tool cavity in the countersunk head has a multiple tooth cavity configuration, which would be shaped to receive a TORX bit. The vibration-dampening member includes a vibration block and a threaded shaft. The threaded shaft extends outward from a bottom of the vibration block. The threaded shaft is threadably engagable with the threaded bore. The vibration dampening material is obtained from a vibration stabilizer manufacturer. A second embodiment of the vibration dampening limb bolt includes the hollow bolt with an unthreaded bore and a vibration-dampening member with a rod projection having at least one o-ring.

14 Claims, 3 Drawing Sheets

(56) References Cited

U.S. PATENT DOCUMENTS

| | | | |
|---|---|---|---|
| 2015/0023760 A1* | 1/2015 | Bove, III | F16B 13/002 411/383 |
| 2015/0152906 A1* | 6/2015 | Lai | F16B 5/065 411/403 |

* cited by examiner

US 9,759,510 B1

VIBRATION DAMPENING LIMB BOLT

BACKGROUND OF THE INVENTION

1. Field of the Invention

The present invention relates generally to archery bows and more specifically to a vibration dampening limb bolt, which provides vibration dampening to a junction of a limb and a riser.

2. Discussion of the Prior Art

There are numerous limb vibration dampeners in the art. The limb vibration dampeners are attached somewhere along a length of the limb. However, it appears that the prior art does not disclose a vibration dampening limb bolt.

Accordingly, there is a clearly felt need in the art for a vibration dampening limb bolt, which dampens the greatest location of vibration on a limb, while adding a minimum of weight to a archery bow.

SUMMARY OF THE INVENTION

The present invention provides a vibration dampening limb bolt, which adds a minimum of weight to an archery bow. The vibration dampening limb bolt preferably includes a hollow bolt and a vibration-dampening member. The hollow bolt includes a countersunk head and a bore. The bore extends into at least quarter of a length of the hollow bolt. The bore is threaded to form a threaded bore. It is preferable that a tool cavity formed in the countersunk head has a multiple tooth cavity configuration. The multiple tooth cavity configuration is preferably shaped to receive a TORX bit. TORX is a registered trademark of Acument Intellectual Properties, LLC of Troy, Mich. However, a hex tool cavity could also be used. The vibration-dampening member includes a vibration block and a threaded shaft. The threaded shaft extends outward from a bottom of the vibration block. The threaded shaft is threadably engaged with the threaded bore. The vibration block preferably has a cap shape, but other shapes may also be used. The vibration block is preferably fabricated from a proprietary vibration dampening material. The vibration dampening material is obtained from a vibration stabilizer manufacturer, such as LimbSaver of Shelton, Wash. The hollow bolt provides reduced resonance, because of its reduced weight. The vibration-dampening member provides additional reduction in resonance, when retained in the hollow bolt. A second embodiment of the vibration dampening limb bolt includes the hollow bolt with an unthreaded bore. The threaded stud of the vibration-dampening member is replaced with at least one o-ring retained in at least one o-ring groove formed in an outer perimeter of a rod projection.

Accordingly, it is an object of the present invention to provide a vibration dampening limb bolt, which dampens the greatest location of vibration on a limb.

Finally, it is another objection of the present invention to provide a vibration dampening limb bolt, which adds a minimum of weight to an archery bow.

These and additional objects, advantages, features and benefits of the present invention will become apparent from the following specification.

DETAILED DESCRIPTION OF THE PREFERRED EMBODIMENTS

Figure 1:
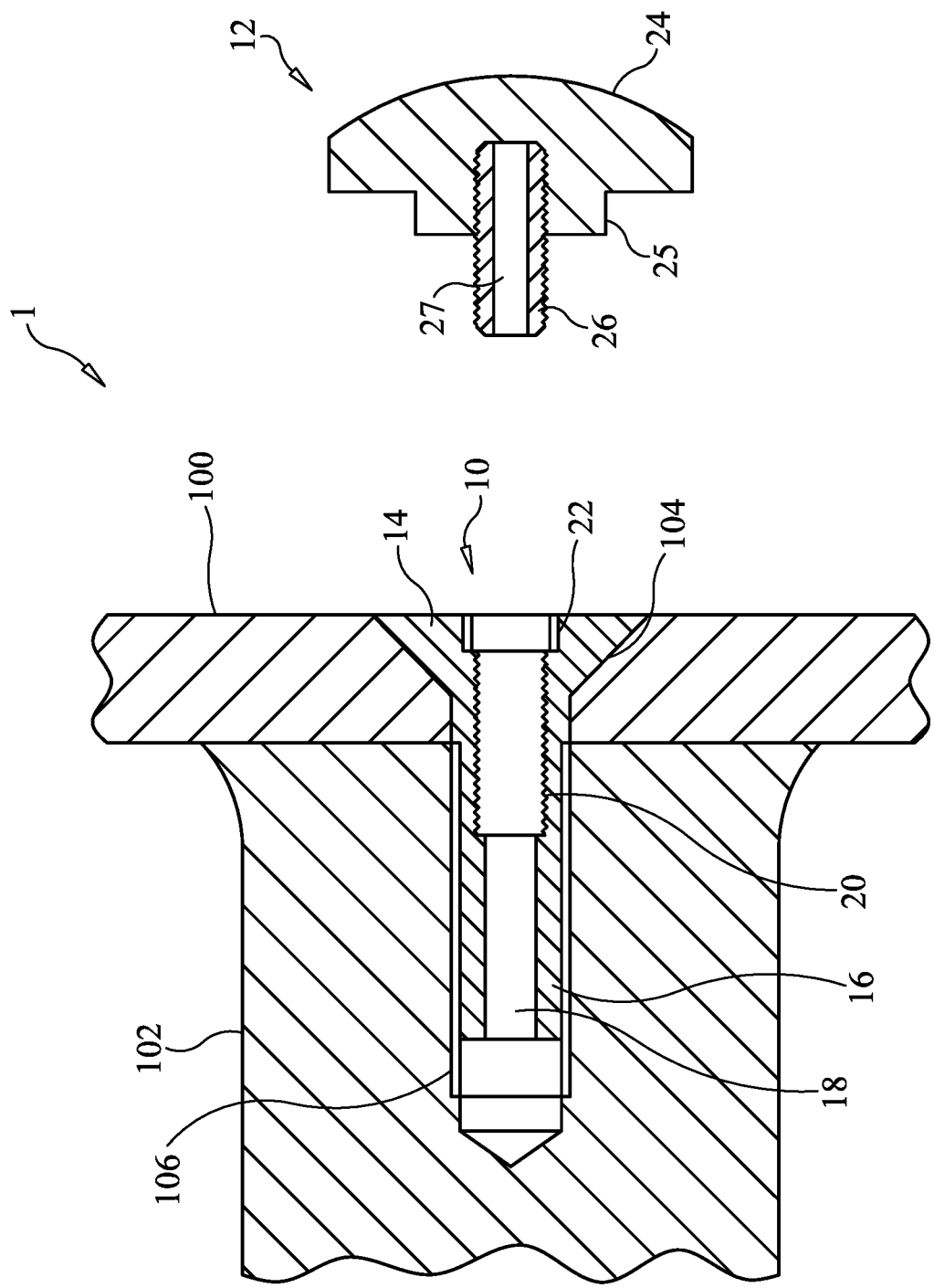
FIG. 1 is a partially exploded cross sectional side view of an archery limb attached to a riser with a hollow bolt and a vibration-dampening member spaced from the hollow bolt of a vibration dampening limb bolt in accordance with the present invention.
Figure 3:
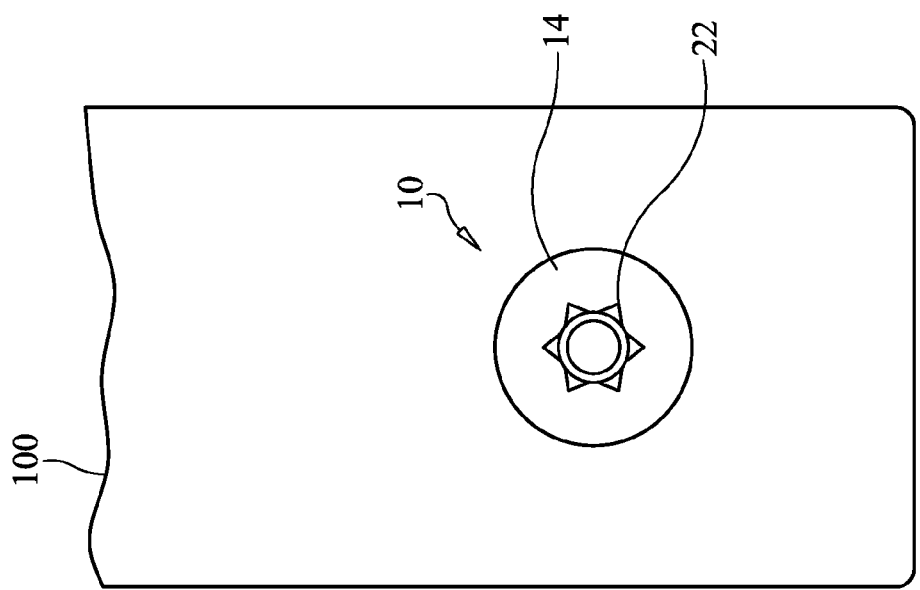
FIG. 3 is an end view of an archery limb attached to a riser with a hollow bolt of a vibration dampening limb bolt in accordance with the present invention.
Figure 2:
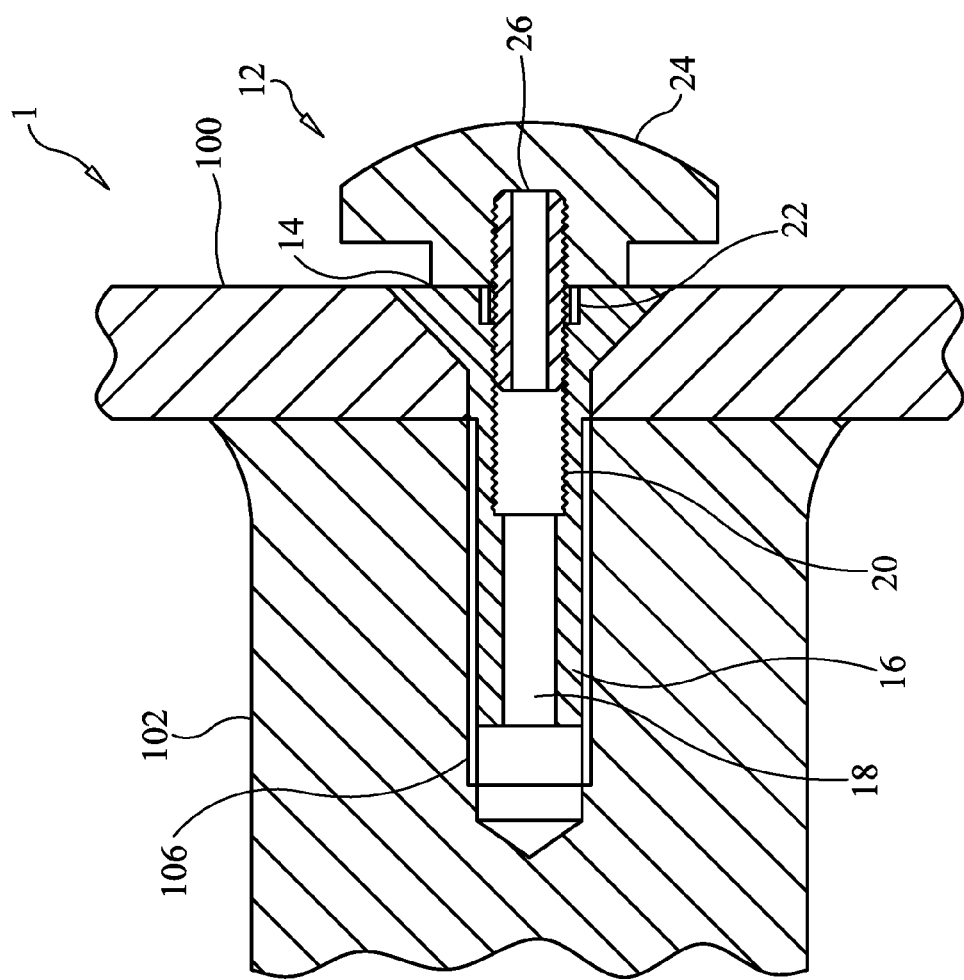
FIG. 2 is a cross sectional view of an archery limb attached to a riser with a hollow bolt and a vibration-dampening member retained in the hollow bolt of a vibration dampening limb bolt in accordance with the present invention.

With reference now to the drawings, and particularly to FIG. 1, there is shown a partially exploded cross sectional view of an archery limb 100 attached to a riser 102 with a hollow bolt 10 and a vibration-dampening member 12. With reference to FIGS. 2-3, a vibration dampening limb bolt 1 preferably includes the hollow bolt 10 and the vibration-dampening member 12. The hollow bolt 10 includes a countersunk head 14, a threaded shaft 16 and a bore 18, which extends at least one quarter of a length of the hollow bolt 10. The head 14 is preferably countersunk, but other shapes may also be used, such cylindrical or hex. Preferably, a thread 20 is formed in at least one half of a length of the bore 18. The hollow bolt 10 is preferably fabricated from a titanium material for weight reduction, but other suitable materials may also be used, such as hardened steel and stainless steel. It is preferable that a tool cavity 22 formed in the countersunk head 14 have a multiple tooth cavity configuration, which would be sized to receive a TORX bit. However, a hex tool cavity could also be used with a hex key.

The vibration-dampening member 12 includes a vibration block 24 and a threaded shaft 26. The threaded shaft 26 preferably includes a weight reduction hole 27 formed therethrough. The threaded shaft 26 extends outward from a bottom of the vibration block 24. The vibration block 24 may be molded around the threaded shaft 26. The threaded shaft 26 is preferably fabricated from a titanium material, but other suitable materials may also be used, such as hardened steel or stainless steel. The vibration block 24 preferably has a cap shape with a bottom boss 25, but other shapes may also be used. The vibration block 24 is preferably fabricated from a proprietary vibration dampening material. The vibration dampening material is obtained from a vibration stabilizer manufacturer. In use, the hollow bolt 10 is inserted through a counter bore 104 in the limb 100; threaded into a threaded tap 106 formed in the riser 102 and the hollow bolt 10 is finally tightened. The threaded shaft 26 of the vibration-dampening member 12 is tightened in the thread 20 of the hollow bolt 10.

Figure 1A:
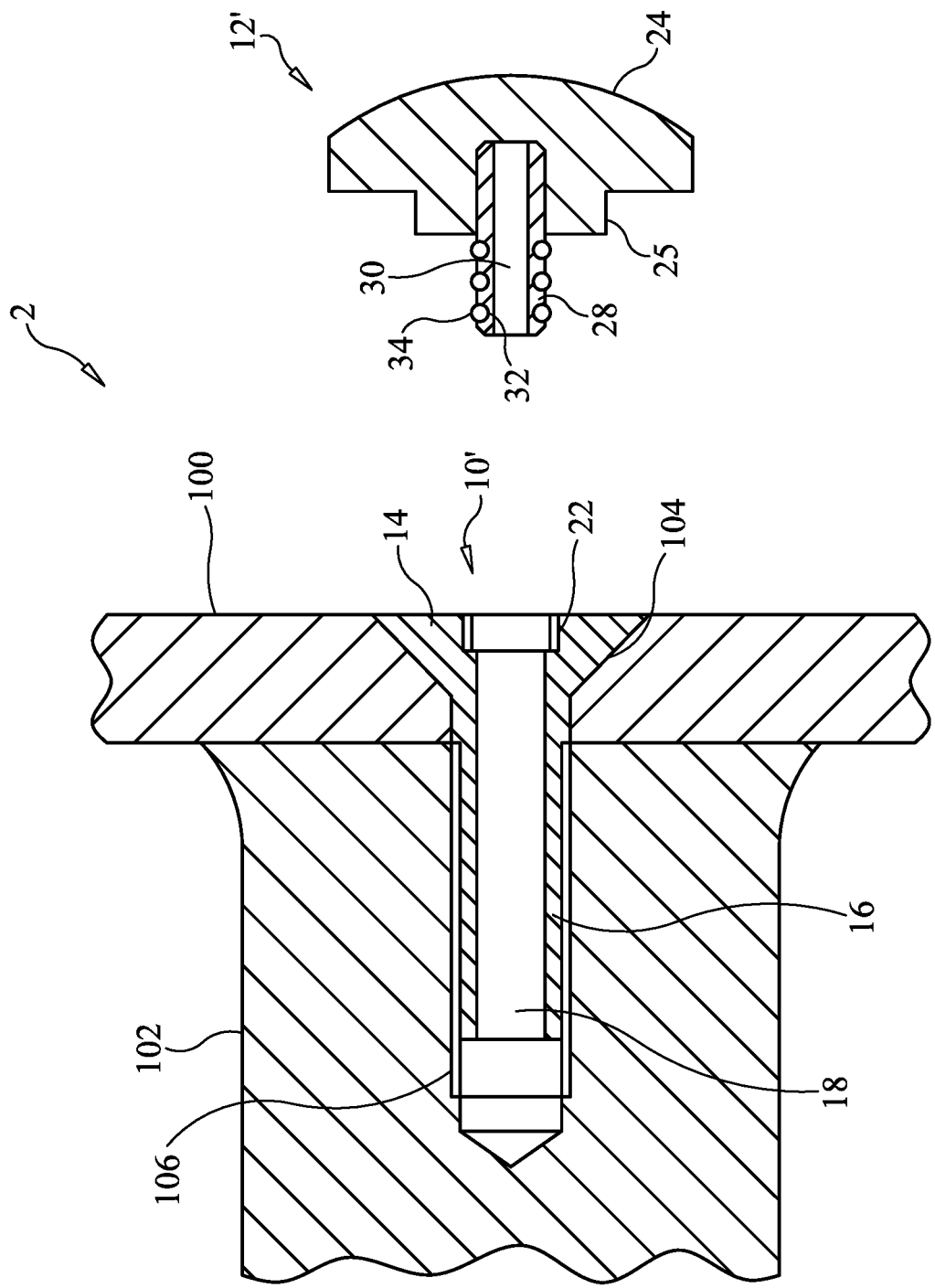
FIG. 1a is a partially exploded cross sectional side view of an archery limb attached to a riser with a second embodiment of a hollow bolt and a second embodiment of a vibration-dampening member spaced from the hollow bolt of a second embodiment of a vibration dampening limb bolt in accordance with the present invention.

With reference to FIG. 1a, a second embodiment of a vibration dampening limb bolt 2 preferably includes a hollow bolt 10' and a vibration-dampening member 12'. The hollow bolt 10' includes the countersunk head 14, the threaded shaft 16 and the bore 18, which extends at least one quarter of a length of the hollow bolt 10'. The hollow bolt 10' is preferably fabricated from a titanium material for weight reduction, but other suitable materials may also be used, such as hardened steel and stainless steel. It is preferable that the tool cavity 22 formed in the countersunk head 14 have a multiple tooth cavity configuration, which would be sized to receive a TORX bit. However, a hex tool cavity could also be used with a hex key.

The vibration-dampening member 12' includes a vibration block 24 and a rod projection 28. The rod projection 28 extends outward from a bottom of the vibration block 24. The vibration block 24 may be molded around the rod projection 28. A weight-lightening hole 30 is preferably formed through a length of the rod projection 28. At least one o-ring groove 32 is formed around a perimeter of the round rod projection 28 to receive at least one o-ring 34. The rod projection 28 is preferably fabricated from a titanium material, but other suitable materials may also be used, such as hardened steel or stainless steel. In use, the hollow bolt 10' is inserted through a counter bore 104 in the limb 100; threaded into a threaded tap 106 formed in the riser 102 and the hollow bolt 10' is finally tightened. The rod projection 28 of the vibration-dampening member 12' is pushed or twisted into the bore 18.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A vibration dampening limb bolt comprising:
   a bolt having a head and a threaded shaft extending from a bottom of said head, said head has a larger perimeter than a perimeter of said threaded shaft, a tool cavity is formed in a top of said head, a bore is formed in said bolt having a length that is least one quarter of a length of the bolt, said bore originating in said tool cavity, said bore being threaded to form a threaded bore; and
   a vibration dampening member includes a vibration block and a threaded shaft, wherein said vibration dampening member reduces resonance of an archery bow limb during use, said threaded shaft extends outward from a bottom of the vibration block, said threaded shaft being capable of being threadably engagable with said threaded bore, wherein said vibration dampening member extends outward from an outer surface of the archery bow limb.

2. The vibration dampening limb bolt of claim 1 wherein: said tool cavity having a multiple tooth cavity configuration.

3. The vibration dampening limb bolt of claim 2 wherein: said tool cavity is shaped to receive a star shaped driver bit.

4. The vibration dampening limb bolt of claim 2 wherein: said tool cavity is shaped to receive a hex key.

5. The vibration dampening limb bolt of claim 1 wherein: said bolt being fabricated from a titanium material.

6. The vibration dampening limb bolt of claim 1 wherein: said bolt head having a round shape.

7. The vibration dampening limb bolt of claim 1 wherein: said vibration block includes the shape of a cap.

8. The vibration dampening limb bolt of claim 1 wherein: a hole is formed through a length of said threaded shaft.

9. A vibration dampening limb bolt comprising:
   a bolt having a head and a threaded shaft extending from a bottom of said head, said head has a larger perimeter than a perimeter of said threaded shaft, a tool cavity is formed in a top of said head, a bore is formed in said bolt having a length that is least one quarter of a length of the bolt, said bore originating in said tool cavity; and
   a vibration dampening member includes a vibration block and a rod projection, wherein said vibration dampening member reduces resonance of an archery bow limb during use, said rod projection extends outward from a bottom of said vibration block, at least one o-ring is retained in a perimeter slot in said rod projection, said rod projection being capable of being inserted into said bore, wherein said vibration dampening member extends outward from an outer surface of the archery bow limb.

10. The vibration dampening limb bolt of claim 9 wherein: said tool cavity having a multiple tooth cavity configuration.

11. The vibration dampening limb bolt of claim 10 wherein: said tool cavity is shaped to receive a star shaped driver bit.

12. The vibration dampening limb bolt of claim 10 wherein: said tool cavity is shaped to receive a hex key.

13. The vibration dampening limb bolt of claim 9 wherein: said bolt being fabricated from a titanium material.

14. The vibration dampening limb bolt of claim 9 wherein: a hole is formed through a length of said rod projection.

\* \* \* \* \*